(12) United States Patent
Uhlmann et al.

(10) Patent No.: US 8,446,073 B2
(45) Date of Patent: May 21, 2013

(54) SPRING SLEEVE FOR FUEL INJECTOR

(75) Inventors: Dietmar Uhlmann, Korb (DE);
Jean-Luc Loutrage, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 662 days.

(21) Appl. No.: 12/531,019

(22) PCT Filed: Jan. 30, 2008

(86) PCT No.: PCT/EP2008/051124
§ 371 (c)(1),
(2), (4) Date: Dec. 11, 2009

(87) PCT Pub. No.: WO2008/110409
PCT Pub. Date: Sep. 18, 2008

(65) Prior Publication Data
US 2010/0102147 A1    Apr. 29, 2010

(30) Foreign Application Priority Data
Mar. 14, 2007    (DE) .......................... 10 2007 012 302

(51) Int. Cl.
*H02N 1/00*    (2006.01)
(52) U.S. Cl.
USPC ............ 310/348; 267/161; 267/162; 267/163
(58) Field of Classification Search
USPC .................................. 267/163, 181, 162, 161
IPC ................................................ F16F 1/00,3/02
See application file for complete search history.

(56) References Cited

U.S. PATENT DOCUMENTS

| | | | |
|---|---|---|---|
| 2,171,185 A * | 8/1939 | Maier ............................ | 267/217 |
| 4,958,101 A | 9/1990 | Takahashi et al. | |
| 7,152,854 B2 * | 12/2006 | Uchida .......................... | 267/178 |
| 7,564,175 B2 * | 7/2009 | Stier et al. ..................... | 310/348 |
| 2006/0113870 A1 | 6/2006 | Kienzler et al. | |

FOREIGN PATENT DOCUMENTS

| | | |
|---|---|---|
| CN | 1784543 A | 6/2006 |
| DE | 10319600 A1 | 11/2004 |
| EP | 1605159 A1 | 12/2005 |
| FR | 2404770 A2 | 4/1979 |
| GB | 2224317 A | 5/1990 |
| JP | 2006525654 A | 11/2006 |
| JP | 2006342851 A | 12/2006 |
| WO | 2004097208 A1 | 11/2004 |
| WO | WO 2004097952 A1 * | 11/2004 |

* cited by examiner

*Primary Examiner* — Len Tran
*Assistant Examiner* — Viet Le
(74) *Attorney, Agent, or Firm* — Michael Best & Friedrich LLP

(57) ABSTRACT

The invention relates to a fuel injector with a holding body and a nozzle body which are joined together and which accommodate a coupler module which has a coupler body enclosed by a spring sleeve. The spring sleeve is open in a circumferential direction at a seam thereof which extends in the longitudinal direction. Either the wall thickness of the spring sleeve varies in the longitudinal direction, or a width of at least one hole geometry in the sheathing of the spring sleeve varies in the longitudinal direction.

10 Claims, 5 Drawing Sheets

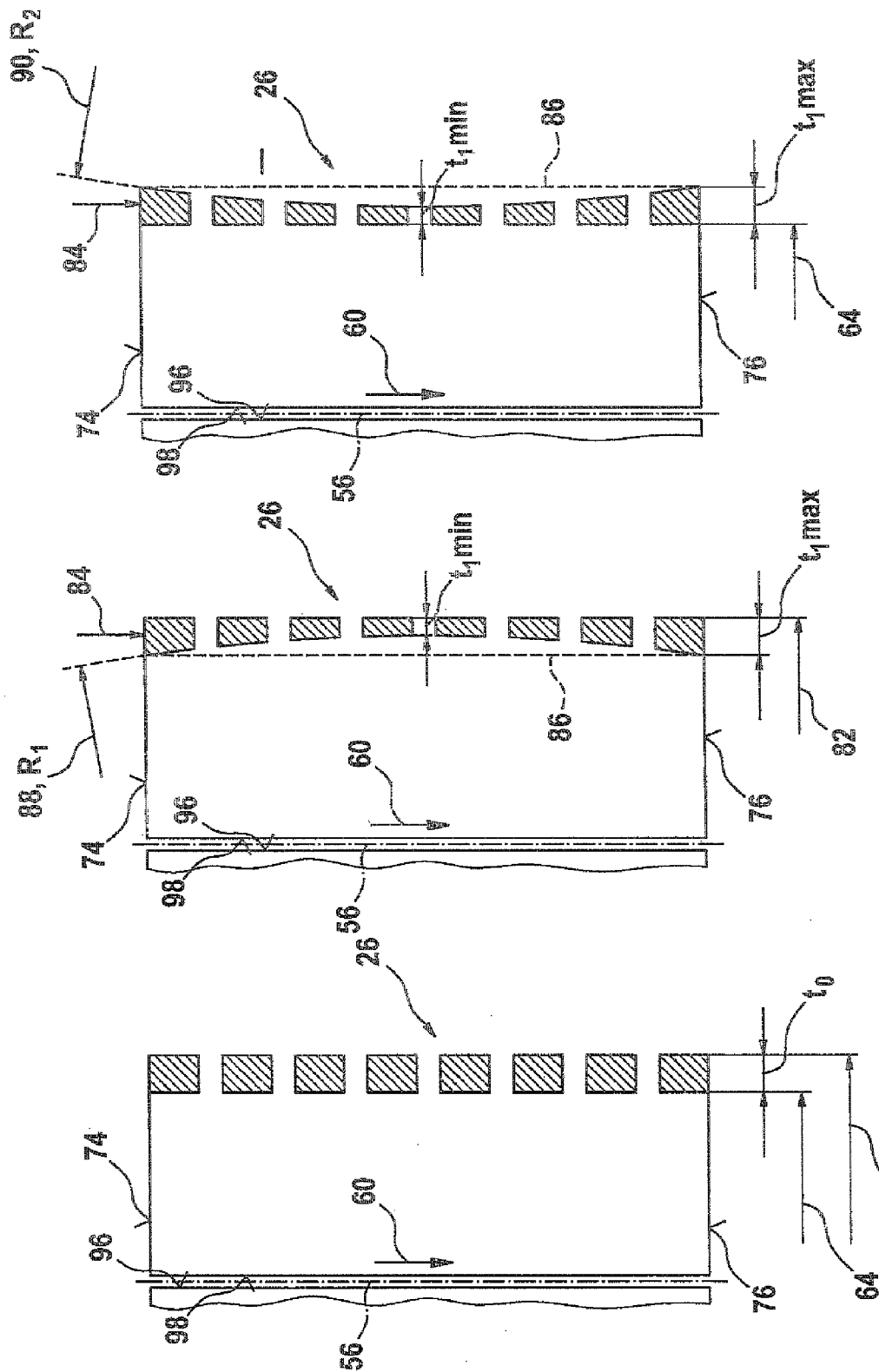

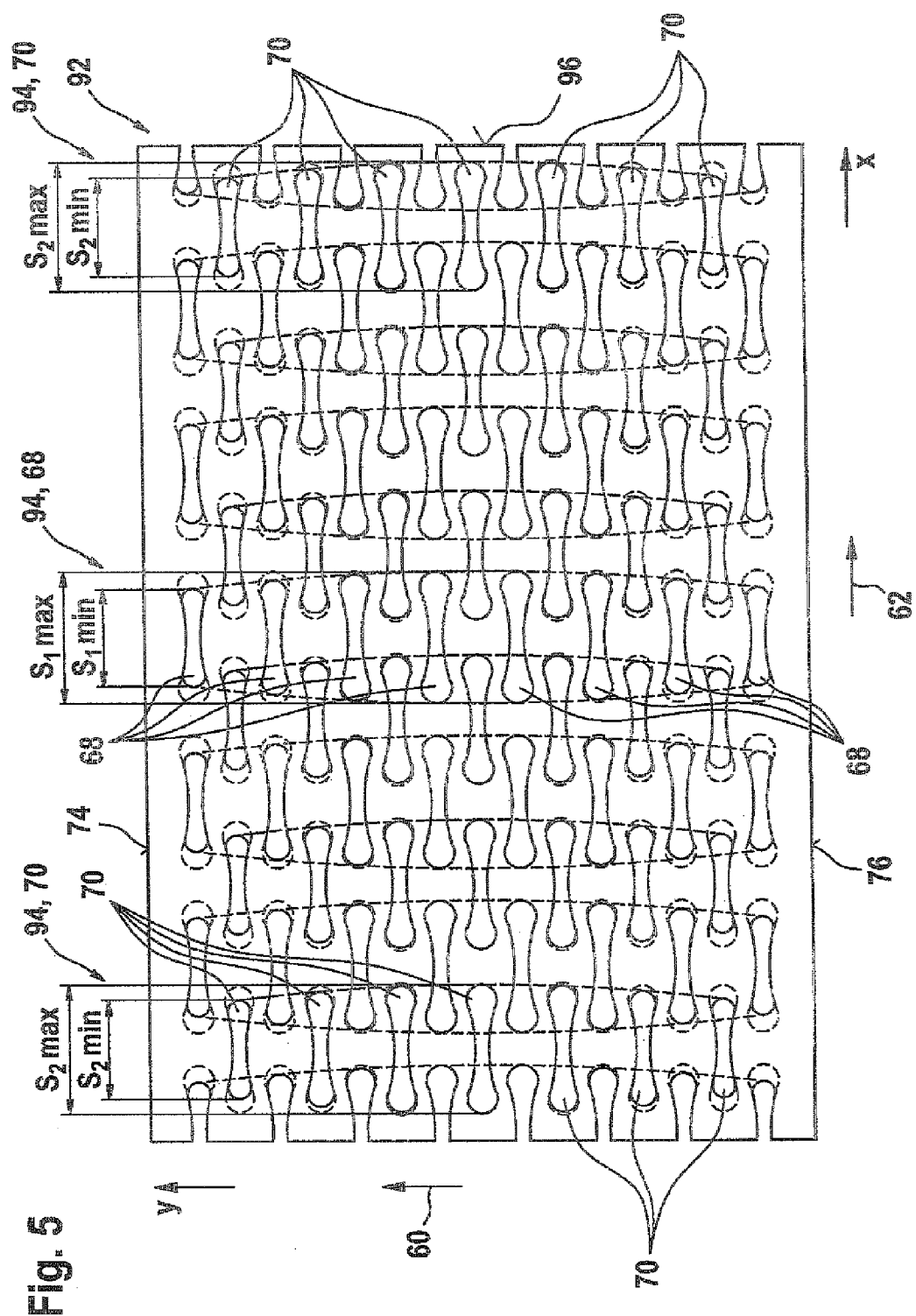

SPRING SLEEVE FOR FUEL INJECTOR

CROSS-REFERENCE TO RELATED APPLICATION

This application is a 35 USC 371 application of PCT/EP2008/051124 filed on Jan. 30, 2008.

BACKGROUND OF THE INVENTION

1. Field of the Invention

The invention relates to a fuel injector with a holding body and a nozzle body.

2. Description of the Prior Art

DE 196 50 865 A1 has disclosed a solenoid valve for controlling the fuel pressure in a control chamber of an injection valve, for example in a common rail/high-pressure accumulator injection system. The fuel pressure in the control chamber is used to control a stroke motion of a valve piston by means of which an injection opening of the injection valve is opened or closed. The solenoid valve includes an electromagnet, a movable armature, and a valve element that is moved by the armature, is acted on in the closing direction by a valve closing spring, and cooperates with the valve seat of the solenoid valve, thus controlling the flow of fuel out of the control chamber.

In fuel injectors that have been used up to this point, a screw connection is produced by means of a clamping nut, which connects a nozzle body, a throttle plate resting against it, and a valve plate of the fuel injector to the holding body of the fuel injector. Firstly, it is of secondary importance whether the fuel injector is actuated by means of a piezoelectric actuator or by means of a solenoid valve. In general, a sealing ring preferably made of PTFE is used to seal the low-pressure region of the fuel injector in relation to the outside. In order to attach the nozzle clamping nut—which as a rule encompasses a nozzle body, a nozzle plate, and a valve plate—to the holding body, a thread is embodied on the inside of the nozzle clamping nut. By means of this thread, the prestressing force produces a screw-connected assembly composed of the holding body and nozzle body as well as the components inserted between them. The production of the thread on the inside of the nozzle clamping nut on the one hand and on the outer circumference surface of the holding body on the other hand is complex and expensive; in addition, an undesirable leakage can occur at the thread and an unevenly distributed action of the prestressing force introduced into the screw-connected assembly by the clamping torque of the thread.

In fuel injectors, couplers are used, which are as a rule modularly embodied and extend between a switching valve of the fuel injector and an actuating element, whether the latter is a solenoid valve or a piezoelectric actuator. The coupler modules previously used in fuel injectors include an open spring sleeve, which is contained in the coupler module and subjected to powerful dynamic stresses during operation and therefore must be embodied in a very rugged fashion.

Previous embodiment versions of a spring sleeve inserted into the coupler module include annularly arranged holes that extend in alternatingly situated patterns of holes. The spring sleeve is embodied, for example, in the form of an open spring sleeve and has two different stamping geometries, which assure that the open spring sleeve remains free of transverse forces when it is placed under axial stress.

During injector operation, individual differential distances $d_1$ through $d_7$ are produced, which differ from one another when subjected to dynamic stress as opposed to static stress. They vary in a chronological sequence. Under a static load, the differential distances $d_1$ through $d_7$ are the same size as one another and each correspond to a fraction of the total length of the spring sleeve.

The differential distances and the connected local dynamic stress is significantly higher in the edge region of the for example open spring sleeve and decreases toward its middle. An optimized embodiment of the as a rule open spring sleeve makes it possible to increase the ruggedness, i.e. the number of stress cycles that can be endured without damage.

ADVANTAGES AND SUMMARY OF THE INVENTION

The invention proposes an open spring sleeve that has a higher ruggedness with regard to dynamic stress during operation of the fuel injector. The spring sleeve proposed according to the invention has two different hole geometries that are embodied in the circumference surface of the spring sleeve—which is embodied in the form of a hollow cylinder—in order to assure that it is free of transverse forces when placed under axial stress.

During injector operation, individual differential distances $d_1$ through $d_7$ of the spring sleeve proposed according to the invention are for example higher under dynamic stress in comparison to static stress in chronological sequence and also vary in relation to one another. When the open spring sleeve proposed according to the invention is placed under static stress, the individual differential distances $d_1$ through $d_7$ are all the same size and each correspond to $1/7$ of a total length $d_{tot}$ of the open spring sleeve proposed according to the invention.

The differential distances and therefore the local dynamic stress of the open spring sleeve proposed according to the invention is higher in the edge region and decreases toward its middle. The optimized embodiment of the open spring sleeve proposed according to the invention therefore makes it possible to increase the ruggedness of the spring sleeve so that it is able to withstand a higher local stress particularly in the edge region. As a result, stress cycle numbers of $>1.2 \times 10^9$ load changes can occur without damage to the component during operation of the fuel injector.

According to the invention, the mechanical stress of the open spring sleeve is embodied as homogeneous in the longitudinal direction. To that end, it is possible either to vary the wall thickness of the spring sleeve proposed according to the invention in the longitudinal direction or to vary the hole geometry of the holes provided in the circumference surface of the spring sleeve.

According to a first advantageous embodiment of the design proposed according to the invention, it is possible to vary the wall thickness of the material of the open spring sleeve. Preferably, the wall thickness of the open spring sleeve proposed according to the invention is varied in the longitudinal direction; it is possible for either the inner diameter of the open spring sleeve or the outer diameter of the open spring sleeve to vary. It is also possible for both the inner and outer diameter of the spring sleeve to vary. Preferably, the variation of the wall thickness is embodied so that there is a difference of approx. 20% between the minimum and maximum wall thickness of the material of the open spring sleeve.

Because of the greater wall thickness in the edge region of the spring sleeve, i.e. at its upper and lower end with a convexly or concavely extending variation of the wall thickness, when the spring sleeve is subjected to dynamic stress, this results in less significant local deformations in these regions, i.e. at the upper end surface and the lower end surface, therefore yielding less intense resulting stresses in these regions.

Preferably, the variation of the wall thickness is set so that in the middle, it corresponds to the wall thickness when there is a constant wall thickness over the longitudinal direction so that there is no change in the overall rigidity, i.e. the spring rate, of the open spring sleeve proposed according to the invention. The spring sleeve proposed according to the invention is inserted, for example, into the coupler body of a coupler module of a fuel injector and serves to reset the coupler module upon deactivation of the current supply to an actuating mechanism, regardless of whether the latter is a piezoelectric actuator or a solenoid valve. The spring sleeve proposed according to the invention fulfills two functions. First, it serves to restore the coupler module, in particular the coupler piston, and second, because of its static prestressing, the spring sleeve exerts a prestressing force (compressive force) on a piezoelectric actuator.

In a second advantageous embodiment of the design proposed according to the invention, in lieu of a variation of the wall thickness of the open spring sleeve as a function of the longitudinal direction, a modification of the embodiment of holes in the circumferential surface of the open spring sleeve is provided. In the open spring sleeve proposed according to the invention, whose abutting ends form a dividing seam, a first hole geometry and a second hole geometry are provided in alternating sequence. As a function of the longitudinal direction of the open spring sleeve, both the first and second hole geometries can be embodied in terms of their width between a first width $S_{1,min}$ and $S_{1,max}$ with regard to a first hole geometry and can be embodied with regard to a minimum width $S_{2,min}$ and a maximum width $S_{2,max}$ with regard to a second hole geometry.

According to the variation of the hole geometry as a function of the longitudinal direction proposed according to the invention, the width of both the first hole geometry and the second hole geometry in the edge region of the open spring sleeve proposed according to the invention amounts to only approx. 80% of the hole width in the middle.

Through the variation of the hole width as a function of the longitudinal direction carried out in the second embodiment of the present invention, the open spring sleeve proposed according to the invention is stiffened in the edge region, correspondingly reducing the local deformations in this region.

The result is a more homogeneous stressing of the open spring sleeve when it is subjected to a dynamic load during operation of the fuel injector. In order not to change the overall rigidity, i.e. the spring rate, of the open spring sleeve, it is necessary to assure that the middle hole width or the middle wall thickness according to the first embodiment corresponds approximately to the value of the width of the holes with a constant hole width of both the first hole geometry and the second hole geometry.

BRIEF DESCRIPTION OF THE DRAWINGS

The invention will be described in greater detail below in conjunction with the drawings.

FIG. 5 is a developed view of a spring sleeve equipped with holes whose widths vary in the longitudinal direction, said holes belonging to a first hole geometry and a second hole geometry embodied in the circumference surface of the open spring sleeve.

DESCRIPTION OF THE PREFERRED EMBODIMENTS

Figure 1:
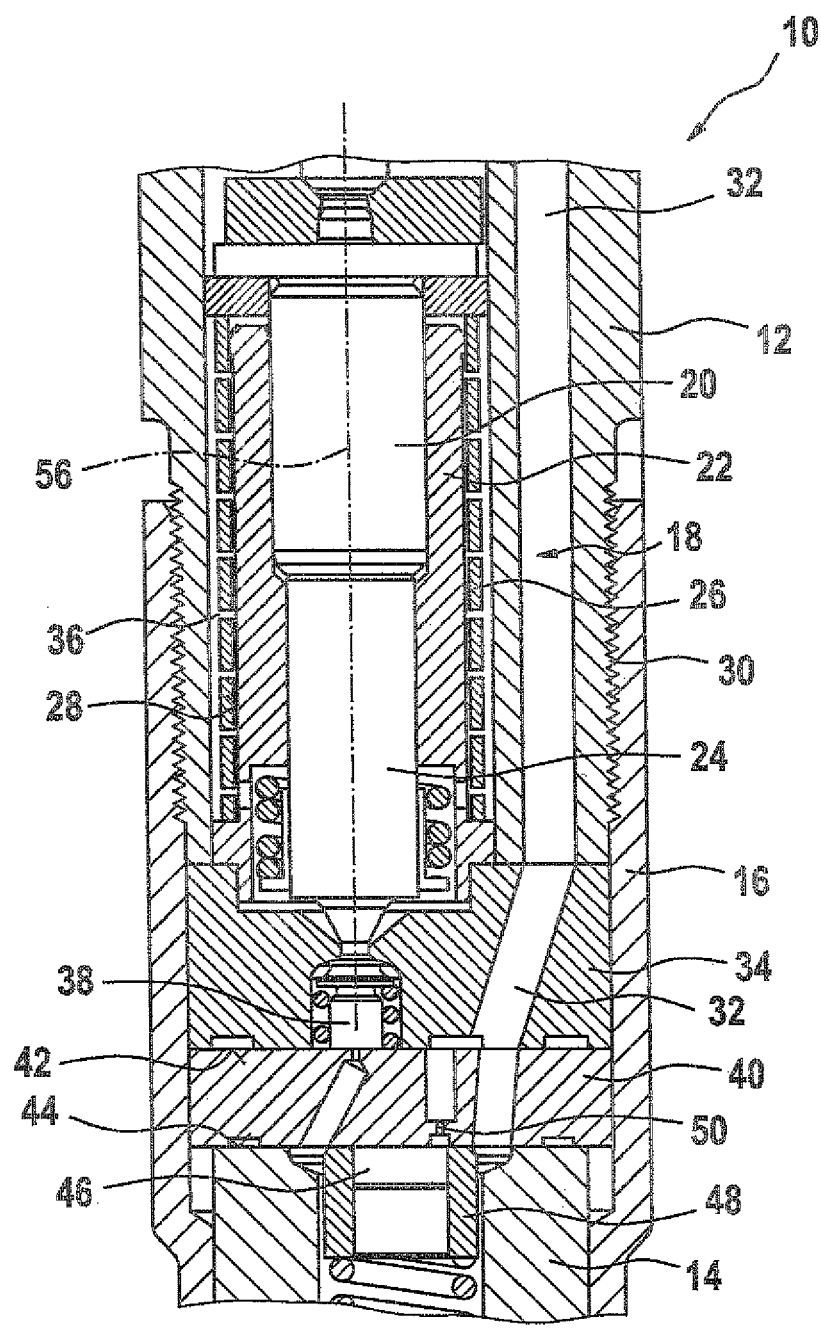
FIG. 1 shows a section through a fuel injector whose holding body accommodates a coupler module equipped with a spring sleeve according to the prior art.

FIG. 1 shows a section through a fuel injector according to the prior art, which includes a coupler module.

FIG. 1 shows a fuel injector 10 that includes a holding body 12 and a nozzle body 14. The holding body 12 and the nozzle body 14 are connected to each other via a nozzle clamping nut 16. The holding body 12 has a cavity 36 in which a coupler module 18 is accommodated.

The coupler module 18 includes a coupler piston 20 and a coupler body 22. The coupler body 22 encompasses both the coupler piston 20 and a piston 24 on which the coupler piston 20 acts. A circumference surface 28 of the coupler body 22 is encompassed by a spring sleeve 26.

It is clear from the sectional depiction according to FIG. 1 that the holding body 12 and the nozzle body 14 are connected to each other at a screw connection 30, with the interposition of a valve plate 34 and the throttle plate 40. An inlet 32 extends through the holding body 12, the valve plate 34, and the throttle plate 40 and contains fuel at system pressure, which acts on the fuel injector 10.

An actuating mechanism of the fuel injector 10, which is not shown in detail in FIG. 1 and could be a solenoid valve or a piezoelectric actuator, is operatively connected to a switching valve 38 by means of the coupler module 18. A stroke motion executed by the actuating mechanism, regardless of whether it is a solenoid valve or a piezoelectric actuator, is converted by the coupler module 18 into a switching movement at the valve 38.

The sectional depiction in FIG. 1 also shows that the valve 38 is embodied in the valve plate 34. Situated below the valve plate 34 is the throttle plate, identified with the reference numeral 40, whose first end surface is identified with the reference numeral 42 and whose second end surface is identified with the reference numeral 44. The second end surface 44 of the throttle plate 40 has a control chamber 46 that is in turn delimited by a control chamber sleeve 48. A spring element places the control chamber sleeve 48 against the second end surface 44 of the throttle plate 40. The reference numeral 50 indicates an inlet throttle via which the control chamber 46 of the fuel injector is acted upon by fuel at system pressure via the inlet 32 that extends through the holding body 12, the valve plate 34, and the throttle plate 40.

Figure 2:
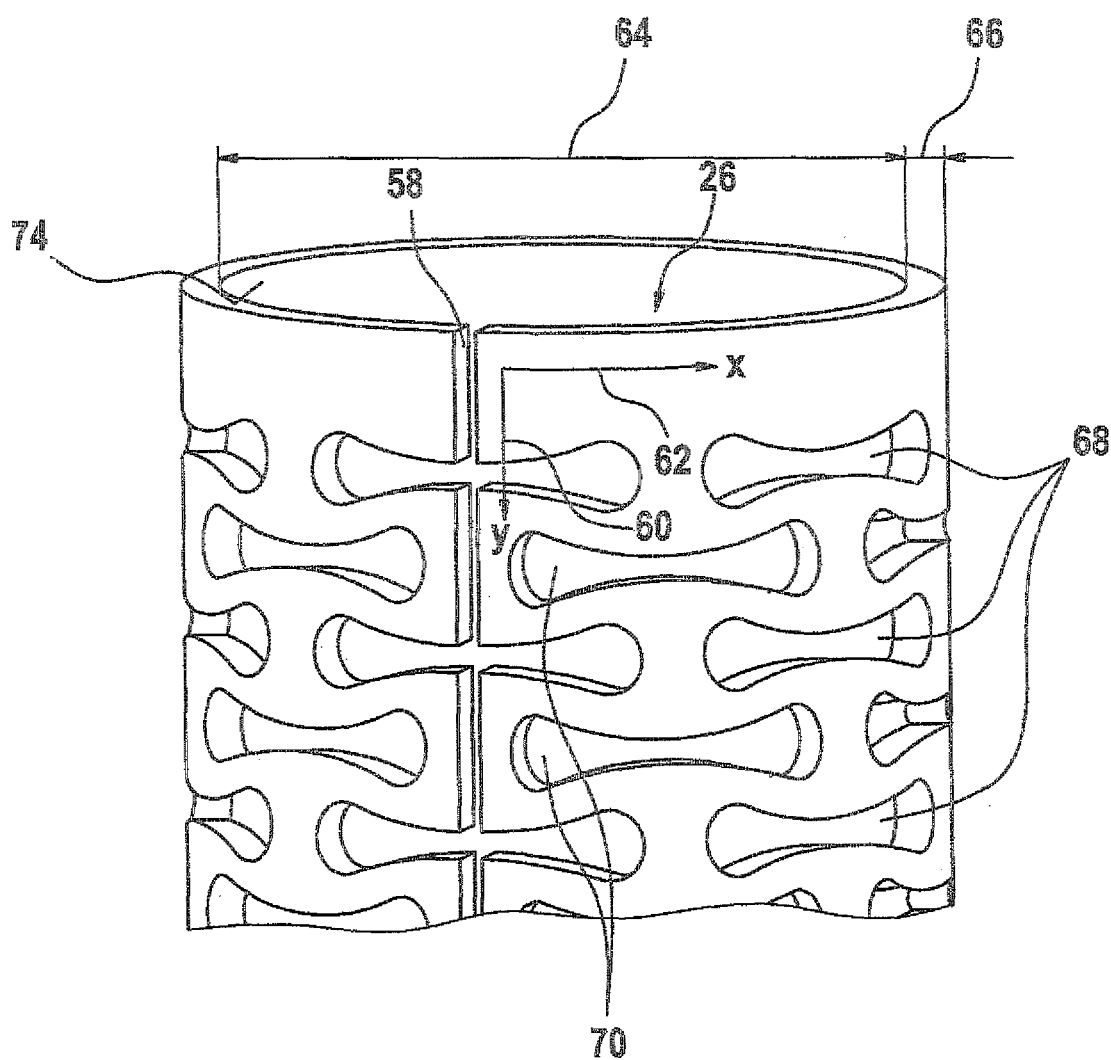
FIG. 2 is a perspective depiction of the upper part of a spring sleeve proposed according to the invention.

FIG. 2 is a perspective depiction of the upper region of the spring sleeve proposed according to the invention.

The spring sleeve 26 according to the depiction in FIG. 2 is accommodated on the circumference surface of the coupler body 22, as shown in FIG. 1. The spring sleeve 26 executes a return of the coupler piston 20 and the piston 24 of the coupler module 18 in relation to each other upon deactivation of the supply of current to the actuating mechanism for actuating the fuel injector 10, i.e. for relieving the pressure in its control chamber 46. The spring sleeve 26 is subjected to powerful mechanical stresses and is subjected to on the order of $1.2 \times 10^9$ load cycles during operation of the fuel injector 10.

The spring sleeve 26 proposed according to the invention, which is shown in the partial perspective depiction in FIG. 2, includes a seam 58. Ends of the material of the spring sleeve 26 are situated opposite each other on both sides of the seam 58, without touching each other. The circumference direction on the circumferential surface of the spring sleeve 26 is labeled with the reference numeral 62 (x direction); the longitudinal direction on the circumferential surface of the spring sleeve 26 proposed according to the invention is labeled with the reference numeral 60 (y direction). The spring sleeve 26 shown in FIG. 2 has an inner diameter $D_i$, see reference numeral 64. A wall thickness of the spring sleeve 26 according to FIG. 1 is labeled with the reference numeral 66 (dimension $t_0$).

The perspective depiction of the upper region of the spring sleeve 26 in FIG. 2 shows that the material, i.e. of the circumference surface of the spring sleeve 26, has a first hole geometry 68 and second hole geometry 70 formed into it. Holes of the first hole geometry 68 and holes of the second hole geometry 70 are embodied as elongated in the x, or circumferential direction with a bulge at each end in an offset arrangement relative to one another in the material of the spring sleeve 26. The holes of the first hole geometry 68 differ from the holes embodied in the second hole geometry 70 by virtue of a greater width in comparison to the width of the holes of the second hole geometry 70. The reference numeral 74 indicates the top of the spring sleeve 26 proposed according to the invention, which has a seam 58 that extends in the longitudinal direction 60 in the y direction.

Figure 3:
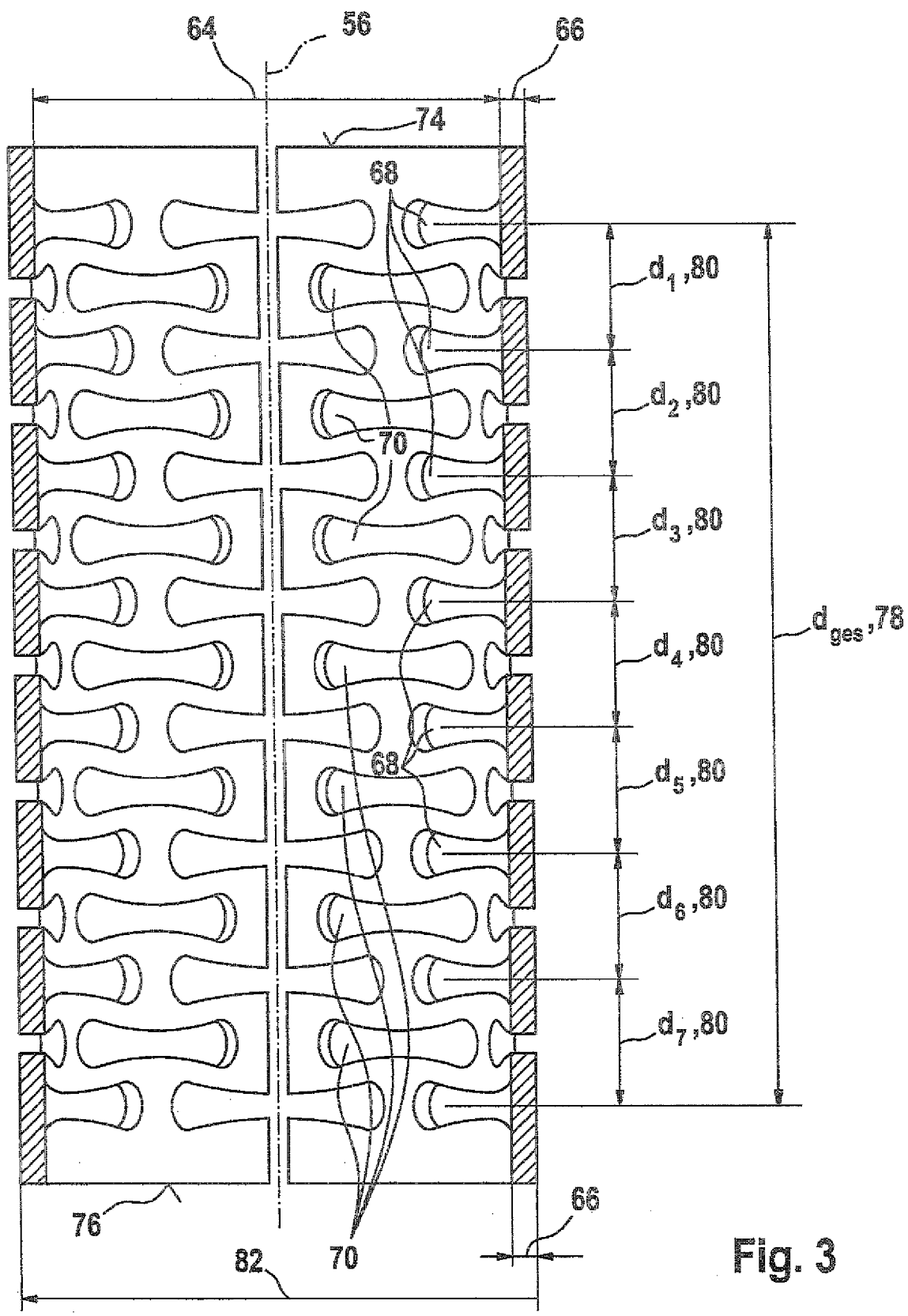
FIG. 3 is a longitudinal section through the open spring sleeve partially depicted in FIG. 2, FIGS. 4.1, 4.2, and 4.3 each show a partial section through a respective exemplary embodiment of the spring sleeve proposed according to the invention, with a constant inner and outer diameter, with a varying inner diameter, and with a varying outer diameter.

FIG. 3 shows a section through an embodiment of the spring sleeve proposed according to the invention, with a constant inner diameter and constant outer diameter.

It is clear from FIG. 3 that the spring sleeve 26, which is symmetrical to the center line 56 and has the dividing seam 58, has both the top 74 and a bottom 76. The constant thickness of the circumferential surface of the spring sleeve 26—which is embodied as open, i.e. with the dividing seam 58—is labeled with the reference numeral 66 and embodied with the dimension $t_0$.

During operation of the fuel injector, i.e. during the operation of the coupler module 18 (see FIG. 1), the individual differential distances 80 arise, which are labeled $d_1$ through $d_7$ in the depiction according to FIG. 3. When the spring sleeve 26 according to the invention is subjected to dynamic stress, the individual differential distances $d_1$ through $d_7$ are irregular with regard to their chronological sequence and also vary relative to one another. Under a static load, the differential distances—as shown in FIG. 3—$d_1$ through $d_7$ are equal in size and each correspond to 1/7 of the dimension 78, i.e. the total distance $d_{tot}$. It is clear from FIG. 3 that the respective differential distances 80 $d_1$ through $d_7$ each extend from one row of holes that are embodied with the first hole geometry 68 to the next row of holes that are likewise embodied with the first hole geometry 68, skipping the intervening row of holes that are embodied with the second hole geometry 70.

The differential distances, and therefore the local dynamic stresses, are higher in the edge region, i.e. the first and last rows of holes in the longitudinal direction of the spring sleeve 26 proposed according to the invention, and decrease toward the middle of the spring sleeve 26.

The depictions in the sequence of FIGS. 4.1 through 4.3 show embodiments of the open spring sleeve 26 proposed according to the invention, whose wall thicknesses vary as a function of the longitudinal direction (y direction).

It is clear from the depiction in FIG. 4.1 that the spring sleeve 26 depicted in a partial sectional view therein is embodied so that its first abutting edge 96 is separated from a second abutting edge 98 by a dividing seam. As is clear from the sectional depiction according to FIG. 4.1, the wall thickness $t_o$ of the spring sleeve 26 according to FIG. 4.1 is constant, i.e. the spring sleeve 26 has a constant inner diameter 64 $D_i$ and a constant outer diameter 82 $D_a$ extending constantly in relation to the longitudinal direction 60 (y direction). For the sake of completeness, it should be noted that the top of the spring sleeve 26 is identified with the reference numeral 74 in the sectional depiction in FIG. 4.1, while the bottom of the spring sleeve 26 is identified with the reference numeral 76.

FIG. 4.2 shows an embodiment of the open spring sleeve proposed according to the invention, whose outer diameter is constant and whose inner diameter varies over the longitudinal direction.

As is clear from the sectional depiction in FIG. 4.2, the spring sleeve 26 depicted therein is also a spring sleeve whose abutting edges 96, 98 face each other along a seam, without touching each other. It should be noted that in the sequence of FIGS. 4.1, 4.2, and 4.3, the hole patterns are not shown in order to simplify the drawings, however the holes in the first hole geometry 68 and second hole geometry 70 are elongated in the x, or circumferential direction with a bulge on each end, according to the depiction in FIG. 3.

As is also clear from FIG. 4.3, there is a variation 84 in the wall thickness of the spring sleeve 26 in the y direction 60, i.e. in the longitudinal direction. In order to illustrate this, a dashed reference line 86 is included in the drawing in Fig. FIG. 4.3. Since the outer diameter 82 ($D_a$) is constant, the variation of the inner diameter $D_i$ is depicted by means of a inner radius $R_1$, see reference numeral 88. Due to the course of the curvature of the inner radius 88, $R_1$, the varying wall thickness 84 of the spring sleeve 26 shown in FIG. 4.2 assumes a minimum wall thickness $t_{1,min}$ in the middle, i.e. equidistant from the top 74 and bottom 76, and has a maximum wall thickness $t_{1,max}$ in the region of the top 74 and bottom 76. The dimensions $t_{1,min}$ and $t_{1,max}$ relate to a variable inner diameter $D_i$.

Analogous to the depiction according to FIG. 4.2, the depiction according to FIG. 3 shows a spring sleeve proposed according to the invention in which the inner diameter $D_i$ is constant and the outer diameter is embodied as a variable in the longitudinal direction.

In the depiction according to Fie. 4.3, the inner diameter $D_i$ of the sleeve 26 see reference numeral 64, is constant between the top 74 and bottom 76. The spring sleeve 26 shown in the depiction according to FIG. 4.3 is likewise one in which the abutting edges 96, 98 of the circumferential surface face each other in the region of the seam, without touching each other.

The variation of the wall thickness 84 in the embodiment according to FIG. 4.3 is produced by means of an outer radius 90, see $R_2$, so that the varying wall thickness 84 assumes its minimum $t_{2,min}$ in the region of the middle of the spring sleeve 26 and assumes its maximum $t_{2,max}$ in the region of the top 74 and bottom 76 of the spring sleeve 26. In the two embodiments of the spring sleeve 26 proposed according to the invention shown in FIGS. 4.2 and 4.3, a difference of approximately 20% can be embodied between the minimum wall thickness $t_{1,min}/t_{2,min}$ and the maximum wall thickness $t_{1,max}/t_{2,max}$. As a result of the greater wall thickness in the edge region, i.e. in the region of the top 74 and bottom 76 in relation to the longitudinal direction 60 of the spring sleeve 26, when the spring sleeve 26 proposed according to the invention is placed under dynamic stress, this results in significantly reduced local deformations and resulting stresses in these locations. The variation 84 of the wall thickness is carried out so that in the middle, the wall thickness corresponds approximately to the value with a constant wall thickness 66 (dimension $t_0$) so that the overall rigidity, i.e. the spring rate, of the open spring sleeve 26 proposed according to the invention does not change.

In a developed view, FIG. 5 shows another embodiment of the spring sleeve proposed according to the invention, with an optimized design.

It is clear from the depiction in FIG. 5 that a developed circumferential surface 92 of the spring sleeve 26 has an approximately rectangular appearance. The spring sleeve 26 shown in the developed depiction in FIG. 5 has a plurality of rows of holes in the longitudinal direction 60 (y direction), which are alternatingly embodied with the first hole geometry 68 and the second hole geometry 70. In the circumference direction 62 (x direction), the holes in the first hole geometry 68 and second hole geometry 70 are arranged one after another in the circumference direction.

It is clear from the depiction in FIG. 5 that holes of a second hole geometry 70 in the region of the second abutting edge 98 and the opposing holes of the second hole geometry 70 at the first abutting edge 96 have a width progression 94 that is dependent on the longitudinal direction 60. This means that the width of the holes in the second hole geometry 70 at the first abutting edge 96 and second abutting edge 98, starting from the maximum width $S_{2,max}$ that is present in the middle, decreases toward the edge region, i.e. in the direction toward the top 74 and in the direction toward the bottom 76, reaching a minimum width $S_{2,min}$.

An analogous situation is present in the holes situated in the first hole geometry 68. They also have a variable width progression 94 as a function of the longitudinal direction 60 (y direction) in which, starting from the middle of the developed spring sleeve 92, the width of the holes decreases from a maximum hole width $S_{1,max}$ to a minimum hole width $S_{1,min}$ in the region of the top 74 and bottom 76 of the spring sleeve 26.

The length of the holes in the edge region—regardless of whether they are holes in the first hole geometry 68 or holes in the second hole geometry 70—is only approx. 80% the width of the holes in the middle of the developed spring sleeve 92. The edge region is the region of the end surfaces, i.e. the top 74 and bottom 76, respectively, including the first and last rows of holes. Noticeable deformations only occur in the regions in which holes are embodied. In the region extending from the first and last row of holes to the respective end surface, there is relatively little deformation in the longitudinal direction.

This results in a stiffening in the edge region of the spring sleeve 26 proposed according to the invention, i.e. in the region of the top 74 and in the region of the bottom 76, since the width of the holes in these regions—regardless of whether they are embodied with the first hole geometry 68 or with the second hole geometry 70—is smaller than in the middle of the developed spring sleeve in which the respective maximums $S_{1,max}$ and $S_{2,max}$ of the holes of the two hole geometries 68, 70 are situated.

This makes it possible to implement a significantly more homogeneous mechanical stress of the spring sleeve 26 proposed according to the invention when it is subjected to dynamic load during operation of the fuel injector 10. In order to maintain the overall rigidity, i.e. the spring rate, of the open spring sleeve 26 according to the second embodiment shown in FIG. 5, it is important to assure that the hole width in the middle region, $S_1$ and $S_2$ respectively, corresponds to the value that when there is a constant hole width of the holes in the first and second hole geometries 68, 70 in the material of the spring sleeve 26.

The foregoing relates to the preferred exemplary embodiments of the invention, it being understood that other variants and embodiments thereof are possible within the spirit and scope of the invention, the latter being defined by the appended claims.

The invention claimed is:

1. A fuel injector, comprising:
a holding body;
a nozzle body joined to the holding body;
a coupler module accommodated by the holding body and nozzle body joined together, the coupler module having a coupler body; and
a spring sleeve being formed into a generally right cylindrical shape having a circumferential direction and the longitudinal direction, the spring sleeve having a small opening in its circumferential direction and an array of holes which are spaced in both the circumferential direction and the longitudinal direction, the spring sleeve encompassing the coupler body, and the spring sleeve having
a hole geometry with a width in the circumferential direction which varies in the longitudinal direction wherein a first plurality of the holes have a first hole geometry and a second plurality of the holes have a second hole geometry, and wherein both the first and the second plurality of holes have a width in the circumferential direction that changes dependent on the longitudinal direction and further wherein the cylindrically shaped spring, in its longitudinal direction, has a first end region and a second end region, and the width of the first plurality of holes and of the second plurality of holes decreases from a middle of the spring sleeve toward the first and second end regions of the spring sleeve.

2. The fuel injector as recited in claim 1, wherein the opening in the spring sleeve is formed by a first edge and a second edge of the spring sleeve, which edges face each other without touching each other, in the region of a seam that is formed in the longitudinal direction so that the spring sleeve is open in its circumferential direction.

3. The fuel injector as recited in claim 1, wherein the spring sleeve has a plurality of holes having a first hole geometry and a plurality of holes having a second hole geometry, the second plurality of holes being offset from the fist plurality of holes in the circumferential direction.

4. The fuel injector as recited in claim 3, wherein the holes of the first plurality of holes and the second plurality of holes are embodied as essentially elongated with a bulge at each end.

5. The fuel injector as recited in claim 1, wherein the wall thickness of the spring sleeve varies by the spring sleeve having a constant outer diameter and having inner diameter.

6. The fuel injector as recited in claim 5, wherein the spring has a top edge region and a bottom edge region which are spaces apart in the longitudinal direction, and starting from a minimum wall thickness close to its center in its longitudinal direction, the variable inner diameter of the cylindrically shaped spring decreases toward respective top and bottom edge regions in the longitudinal direction of the spring sleeve, reaching a dimension of a maximum wall thickness at the top and bottom edges.

7. The fuel injector as recited in claim 5, wherein there is a difference of 20% in the wall thickness between a minimum wall thicknesses and a maximum wall thicknesses.

8. The fuel injector as recited in claim 6, wherein there is a difference of 20% in the wall thickness between the minimum wall thicknesses and the maximum wall thickness.

9. The fuel injector as recited in claim 1, wherein the first and second plurality of holes has a width in the circumferential direction which goes from a minimum width starting from a top edge in the longitudinal direction, to a maximum width in a middle of the longitudinal direction, and returns to the minimum width toward a bottom edge of the spring sleeve, and the width of holes of the second plurality of holes also goes from a minimum width starting from the top edge in the longitudinal direction, to a maximum width toward the middle, and decreases again to a minimum width toward the bottom edge of the spring sleeve, wherein the width of the holes of the first plurality of holes and the second plurality of holes, at the top longitudinal edge and the bottom longitudinal edge is approximately 80% the width, respectively, of the holes of the first plurality and second plurality of the holes when compared to the holes in the middle.

10. A fuel injector, comprising:
 a holding body;
 a nozzle body joined to the holding body;
 a coupler module accommodated by the holding body and nozzle body joined together, the coupler module having a coupler body; and
 a spring sleeve being formed into a generally right cylindrical shape having a circumferential direction and a longitudinal direction, the spring sleeve having a small opening in its circumferential direction and an array of holes which are spaced in both the circumferential direction and the longitudinal direction, the spring sleeve encompassing the coupler body, and the spring sleeve having a hole geometry with a width in the circumferential direction which varies in the longitudinal direction,
 wherein a first plurality of the holes have a first hole geometry and a second plurality of the holes have a second hole geometry, and wherein both the first and the second plurality of holes have a width in the circumferential direction that changes dependent on the longitudinal direction, and
 further wherein the first and second plurality of holes has a width in the circumferential direction which goes from a minimum width starting from a top edge in the longitudinal direction, to a maximum width in a middle of the longitudinal direction, and returns to the minimum width toward a bottom edge of the spring sleeve, and the width of holes of the second plurality of holes also goes from a minimum width starting from the top edge in the longitudinal direction, to a maximum width toward the middle, and decreases again to a minimum width toward the bottom edge of the spring sleeve, wherein the width of the holes of the first plurality of holes and the second plurality of holes, at the top longitudinal edge and the bottom longitudinal edge is approximately 80% the width, respectively, of the holes of the first plurality and second plurality of holes when compared to the holes in the middle.

* * * * *

UNITED STATES PATENT AND TRADEMARK OFFICE
CERTIFICATE OF CORRECTION

PATENT NO. : 8,446,073 B2  Page 1 of 1
APPLICATION NO. : 12/531019
DATED : May 21, 2013
INVENTOR(S) : Uhlmann et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 751 days.

Signed and Sealed this
Eighth Day of September, 2015

Michelle K. Lee
*Director of the United States Patent and Trademark Office*